United States Patent
Denson (10) Patent No.: US 10,173,547 B1
(45) Date of Patent: Jan. 8, 2019

(54) VEHICLE BATTERY DRAINAGE AVOIDANCE

(71) Applicant: Lytx, Inc., San Diego, CA (US)

(72) Inventor: Craig Denson, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 84 days.

(21) Appl. No.: 15/367,960

(22) Filed: Dec. 2, 2016

(51) Int. Cl.
    *G06F 1/32* (2006.01)
    *B60L 11/18* (2006.01)
    *H02J 7/00* (2006.01)
    *G06F 9/4401* (2018.01)

(52) U.S. Cl.
    CPC ........ *B60L 11/1861* (2013.01); *G06F 1/3212* (2013.01); *G06F 9/4401* (2013.01); *H02J 7/0029* (2013.01); *H02J 7/0063* (2013.01); *H02J 2007/004* (2013.01); *H02J 2007/0067* (2013.01)

(58) Field of Classification Search
    None
    See application file for complete search history.

(56) References Cited

U.S. PATENT DOCUMENTS

| 5,450,321 A * | 9/1995 | Crane | B60R 16/0231 307/10.6 |
| 2003/0097585 A1* | 5/2003 | Girard | G06F 21/575 726/19 |
| 2005/0280676 A1* | 12/2005 | Rybicki | B41J 2/085 347/76 |
| 2008/0082814 A1* | 4/2008 | Kuo | G06F 9/4403 713/2 |
| 2010/0091530 A1* | 4/2010 | Yoshida | H02M 1/36 363/49 |
| 2014/0268922 A1* | 9/2014 | Balakrishnan | H02M 3/156 363/21.17 |

* cited by examiner

*Primary Examiner* — Paul Yen
(74) *Attorney, Agent, or Firm* — Van Pelt, Yi & James LLP (57) ABSTRACT

A system for drainage avoidance includes an interface and a processor. The interface is configured to receive an indication to power on. A wake up voltage is increased after a power on signal is received. The processor is configured to perform a boot sequence, determine whether the boot sequence completed successfully, and in the event the boot sequence completed successfully, provide a reset indication to reset the wake up voltage.

12 Claims, 10 Drawing Sheets

VEHICLE BATTERY DRAINAGE AVOIDANCE

BACKGROUND OF THE INVENTION

Modern vehicles (e.g., airplanes, boats, trains, cars, trucks, etc.) can include a vehicle event recorder in order to better understand the timeline a details of an anomalous event (e.g., an accident). A vehicle event recorder typically includes a set of sensors, e.g., video recorders, audio recorders, accelerometers, gyroscopes, vehicle state sensors, global positioning system (GPS) sensor, etc., that report data, which is used to determine the occurrence of an anomalous event. Sensor data can then be stored and/or transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. A vehicle event recorder typically receives its power from the vehicle power system (e.g., the vehicle battery, the vehicle alternator, etc.). In the event the vehicle event recorder is on when the vehicle is not running, this creates a problem in that the vehicle event recorder depletes the vehicle battery, potentially to the point where it can no longer start the vehicle or even worse to the point where it is completely drained. In some cases, the vehicle event recorder causes the vehicle battery voltage to drop and cuts power to the vehicle event recorder while the vehicle event recorder is in a sensitive state (e.g., before completing a boot cycle). This can render the vehicle event recorder inoperable, or it can cause the vehicle event recorder to reboot constantly until the vehicle battery is drained and so it cannot supply a high enough voltage to power on the vehicle event recorder.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for drainage avoidance comprises an interface and a processor. The interface is configured to receive an indication to power on, where a wake up voltage is increased after a power on signal is received. The processor is configured to perform a boot sequence, determine whether the boot sequence completed successfully, and in the event the boot sequence completed successfully, provide an indication to reset the wake up voltage. In some embodiments, the system for drainage avoidance additionally comprises a memory coupled to the processor and configured to provide the processor with instructions.

In some embodiments, the vehicle event recorder comprises the processor, a memory, data storage, interfaces, hardware circuits, and a power system. The system for drainage avoidance running on the processor interacts with the power system to avoid vehicle battery drainage. The power system comprises a power supply for supplying power to the processor. The power system additionally comprises a comparator for comparing the vehicle battery voltage with a digitally controlled reference voltage. In some embodiments, the digitally controlled reference voltage is controlled using a digital potentiometer. The comparator output controls a power supply enable input, turning the power supply on when the vehicle battery voltage is higher than the digitally controlled reference voltage. The system for drainage avoidance controls the digitally controlled reference voltage in order to prevent the vehicle event recorder from draining the vehicle battery. After the vehicle event recorder is powered on, the digitally controlled reference voltage is increased. The boot process is executed after power on. If the vehicle event recorder achieves a stable state (e.g., a boot process completes successfully), the processor provides an indication to the digitally controlled reference voltage to reset the reference voltage to a baseline value. In the event the processor shuts off before achieving a stable state (e.g., the boot sequence did not complete prior to losing power), the reference voltage is not reset. The vehicle battery voltage must then rise to the increased reference voltage before the processor is able to turn on again. Each time the processor turns on and is unable to remain on until the boot process is complete the reference voltage is increased, until a maximum reference voltage is reached. In some embodiments, the maximum reference voltage comprises a voltage high enough to ensure that the vehicle alternator has turned on, ensuring that the vehicle event recorder is powered by the vehicle alternator and not by the vehicle battery.

In some embodiments, while the vehicle event recorder is turned on and functioning, the vehicle battery voltage is monitored. In the event the vehicle battery voltage or a derived value (e.g., a moving averaged version of the vehicle battery voltage) drops below a threshold (e.g., indicating that the vehicle event recorder is depleting the vehicle battery), the processor provides an indication to the digitally controlled reference voltage to increase the reference voltage and shuts itself down allowing the vehicle battery to recover.

Figure 1:
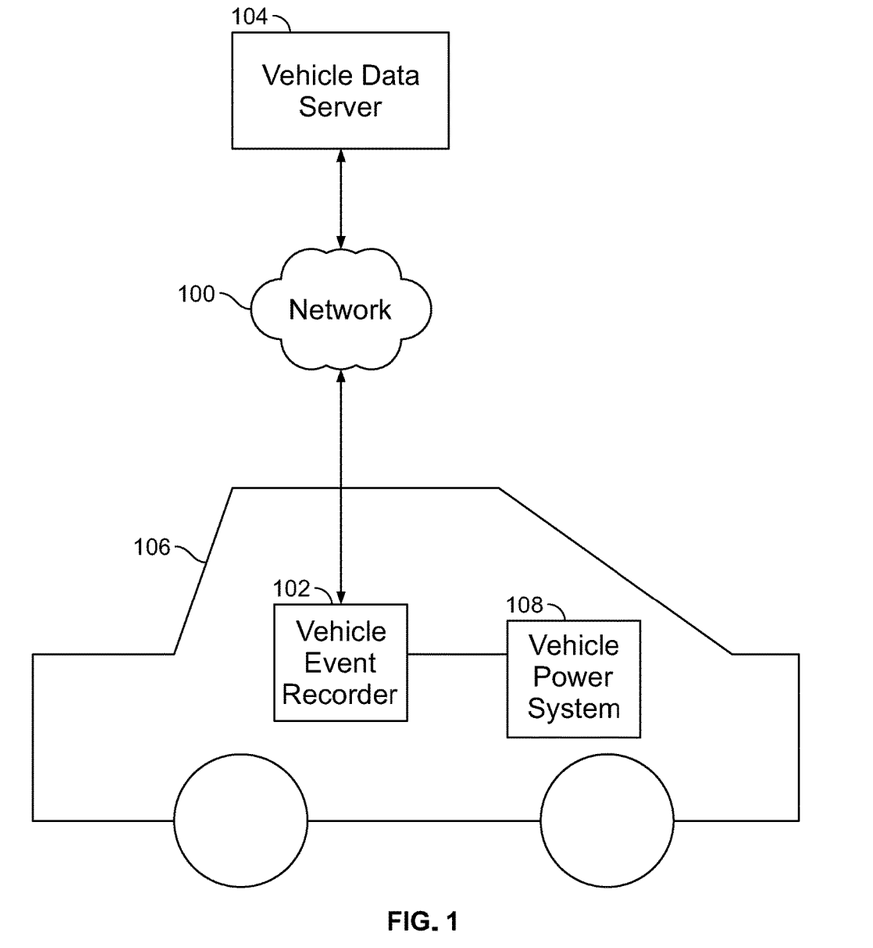
FIG. 1 is a block diagram illustrating an embodiment of a system including a vehicle event recorder.

FIG. 1 is a block diagram illustrating an embodiment of a system including a vehicle event recorder. In the example shown, vehicle event recorder 102 comprises a vehicle event recorder mounted in a vehicle (e.g., a car or truck). Vehicle event recorder 102 includes or is in communication with a set of sensors—for example, video recorders, audio recorders, accelerometers, gyroscopes, vehicle state sensors, proximity sensors, a GPS sensor, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, or any other appropriate vehicle state sensors. Vehicle event recorder 102 comprises a system for receiving and processing sensor data to detect events. In various embodiments, vehicle event recorder 102 is mounted on vehicle 106 in one or more of the following locations: the chassis, the front grill, the dashboard, the rear-view mirror, or any other appropriate location. In some embodiments, vehicle event recorder 102 comprises multiple units mounted in different locations in vehicle 106. Vehicle event recorder 102 includes a communications system for communicating with network 100. Network 100 comprises a network for communications. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. Vehicle 106 additionally comprises vehicle power system 108. Vehicle power system 108 comprises a vehicle power system (e.g., a vehicle battery, a starter motor, an engine, an alternator, etc.) for starting vehicle 106 and for powering electric devices of vehicle 106. Vehicle event recorder 102 receives power from vehicle power system 108.

Figure 2:
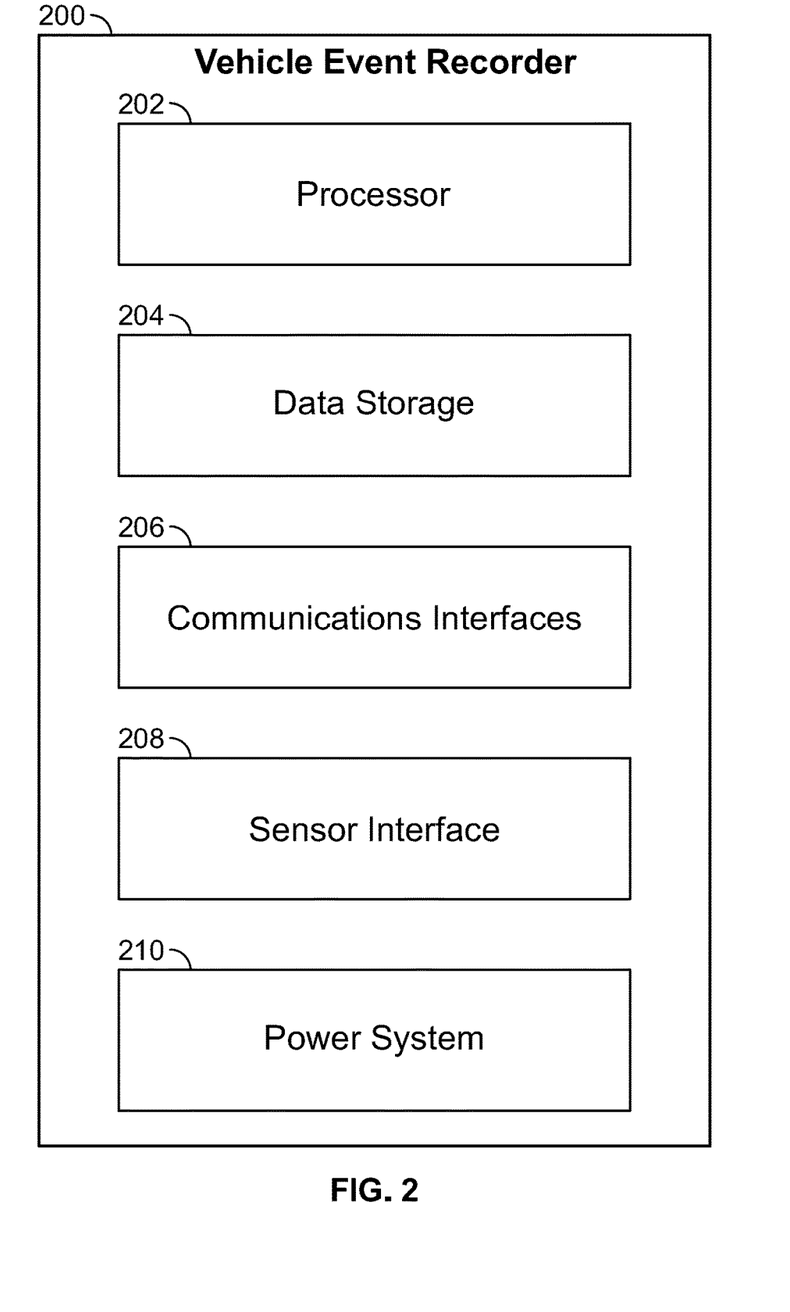
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202, data storage 204, communications interfaces 206, sensor interface 208, and power system 210. Processor 202 comprises a processor for controlling the operations of vehicle event recorder 200, for reading and writing information on data storage 204, for communicating via wireless communications interface 206, and for reading data via sensor interface 208. Power system 210 is for powering processor 202 using a vehicle power system (e.g., vehicle power system 108 of FIG. 1). In some embodiments, power system 210 comprises a regulated power supply. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to a vehicle data server.

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, the last 2 hours, the last day, etc.). In some embodiments, data is deleted from the time-delay buffer after the time-delay period (e.g., a buffer holding the last 30 seconds of data deletes data as soon as it is more than 30 seconds old). In some embodiments, in the event an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, in the event an event is determined from continuously stored data (e.g., after processing the data at a later time), an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded.

Figure 3:
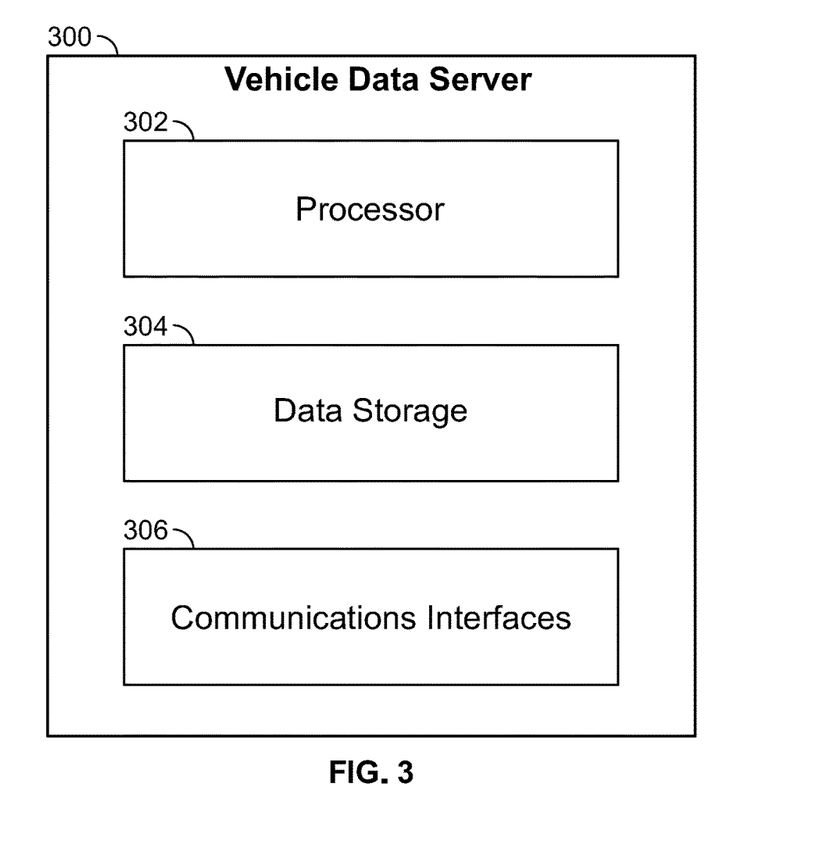
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302 for storing and analyzing event data. Data storage 304 comprises a data storage for event data (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a Global System for Mobile Communications (GSM) interface, a code division multiple access (CDMA) interface, a WiFi™ interface, an Ethernet interface, a universal serial bus (USB) interface, a Bluetooth™ interface, an Internet interface, a fiber optic interface, or any other appropriate interface. In various embodiments, vehicle data server 300 receives events, maneuvers, data, or any other appropriate information from one or more vehicle event recorders.

Figure 4:
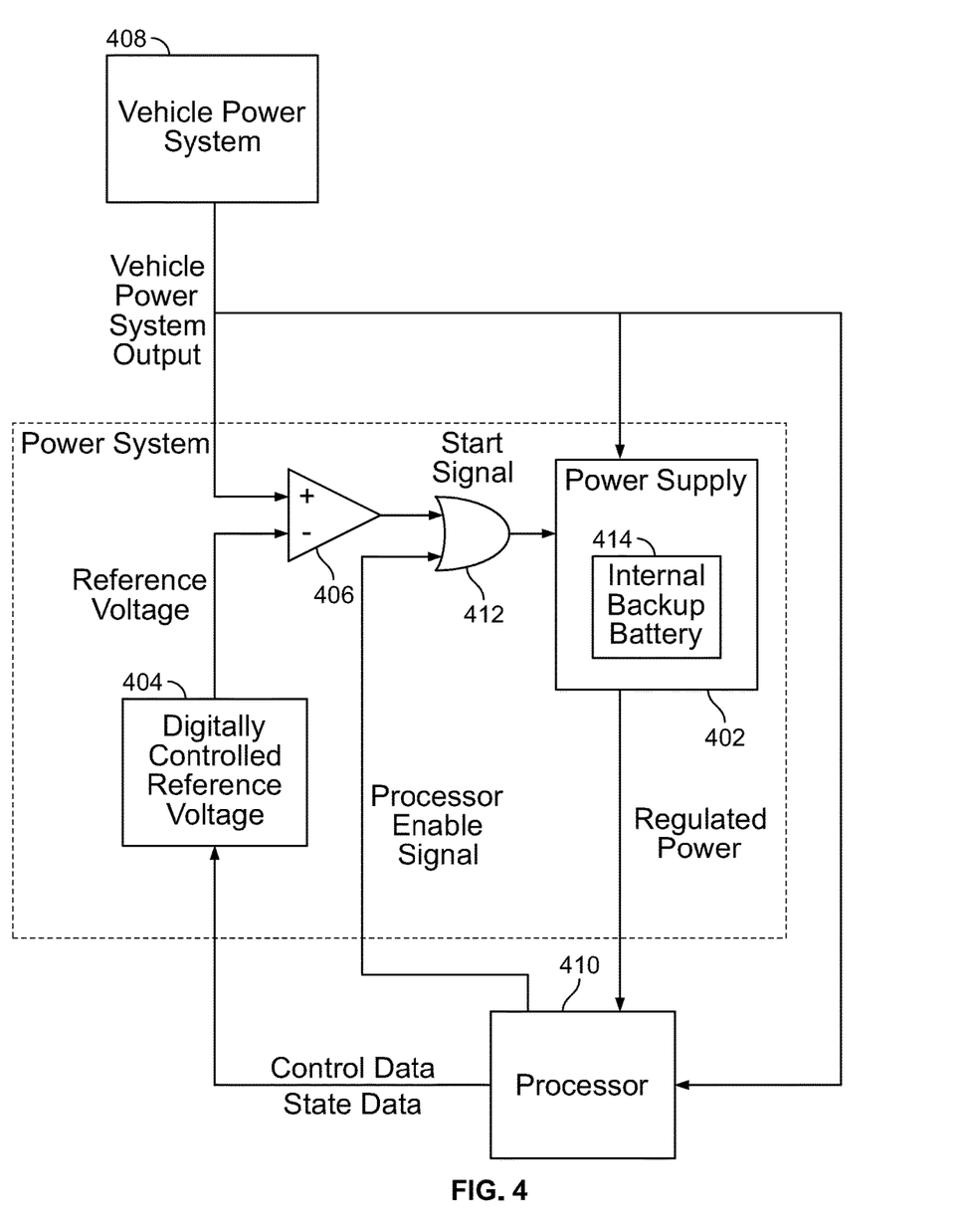
FIG. 4 is a block diagram illustrating an embodiment of a power system for a vehicle event recorder.

FIG. 4 is a block diagram illustrating an embodiment of a power system for a vehicle event recorder. In some embodiments, power system 400 comprises power system 210 of FIG. 2. In the example shown, power system 400 comprises power supply 402. Power supply 402 receives power from vehicle power system 408 and uses it to provide regulated power to processor 410. Power supply 402 includes internal backup battery 414 to provide regulated power to processor 410 in the event that there is a temporary interruption in power from vehicle power system 408 output. In various embodiments, power supply 402 comprises a linear regulator, a switching power supply, power supply safety circuitry, power supply limiting circuitry, or any other appropriate power supply elements. Power supply 402 comprises an enable input for enabling or disabling the output (e.g., when the voltage provided to the enable input of power supply 402 is on, power supply 402 outputs regulated power, and when the voltage provided to the enable input of power supply 402 is off, power supply 402 does not output regulated power). The enable input of power supply 402 is connected to the output of OR 412. OR 412 logically OR's output of comparator 406 and a processor enable signal so that either can enable power supply 402. Comparator 406 comprises a comparator for comparing a first voltage and a second voltage and providing an output signal that is on in the event the first voltage is larger than the second voltage and is off in the event the second voltage is larger than the first voltage. The first voltage connected to comparator 406 comprises the vehicle power system voltage provided by vehicle power system 408. The second voltage connected to comparator 406 comprises a reference voltage provided by digitally controlled reference voltage 404. Digitally controlled reference voltage 404 comprises a voltage source controlled by digital data provided to it by processor 410. The reference voltage provided by digitally controlled reference voltage 404 comprises a base value and is increased in increments until it reaches a maximum value. In various embodiments, the maximum voltage output by digitally controlled reference voltage is 1, 2, 3, 6, 10, or any other appropriate number of increments above the base value. In various embodiments, the reference voltage provided by digitally controlled reference voltage is increased in increments of 0.1 V, 0.5 V, 1 V, or any other appropriate increments. In some embodiments, when processor 410 increments digitally controlled reference voltage 404, processor 410 queries digitally controlled reference voltage 404 for its value, receives state data indicating the value of the reference voltage, determines whether the reference voltage is at the maximum voltage, and in the event the reference voltage is not at the maximum voltage, processor 410 determines a new value for the reference voltage and provides control data to digitally control reference voltage 404 indicating the new value. In the example shown, processor 410 is additionally connected to the vehicle power system voltage provided by vehicle power system 408 (e.g., for monitoring the voltage).

Figure 5:
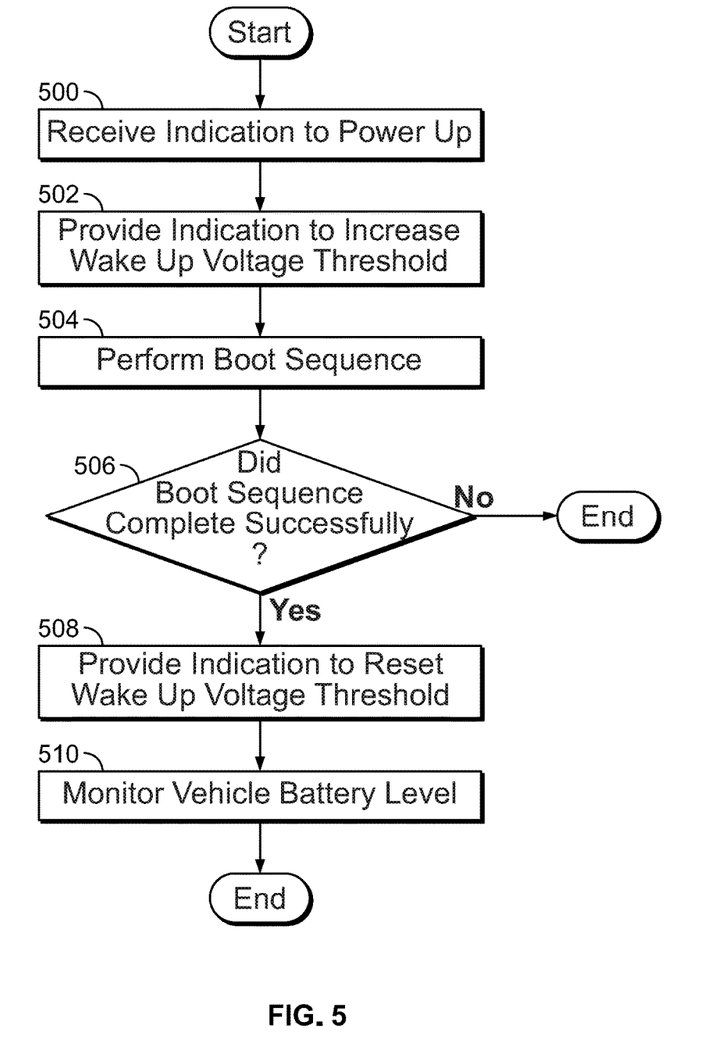
FIG. 5 is a flow diagram illustrating an embodiment of a process for vehicle battery drainage avoidance.

FIG. 5 is a flow diagram illustrating an embodiment of a process for vehicle battery drainage avoidance. In some embodiments, the process of FIG. 5 is implemented by processor 410 of FIG. 4. In the example shown, in 500, an indication to power up is received. For example, power is received by circuits and processors, and the power received indicates power up. In some embodiments, an indication to boot comprises a power supply voltage turning on (e.g., power supply 402 of FIG. 4 providing an output voltage in response to its enable input turning on). In 502, an indication to increase a wake up voltage threshold is provided. For example, a wake up voltage is increased after a power on signal is received. In various embodiments, the wake up voltage is increased using one or more of the following: a processor to read a current wake up voltage (e.g., a digitally controlled voltage reference setting) and set a new increased wake up voltage, a hardware circuit to increase a wake up voltage (e.g., a hardware increment pulse to a counter), or any other appropriate manner of increasing a wake up voltage. In 504, a boot sequence is performed. For example, a boot sequence comprises a set of operations for starting the processor (e.g., initializing processes, loading code into memory, checking file states, etc.). In 506, is determined whether the boot sequence completed successfully. In the event it is determined that the boot sequence did not complete successfully, the process ends. In the event it is determined that the boot sequence completed successfully, control passes to 508. In some embodiments, the process waits for a predetermined period of time (e.g., 10 seconds, 30 seconds, 1 minute, 5 minutes, etc.) after the boot sequence is performed and before it is determined whether the boot sequence completed successfully. In some embodiments, there is not an explicit determination of whether the boot sequence completed successfully. In some embodiments, determining whether the boot sequence completed successfully comprises proceeding to a next code step (e.g., in the event the process is able to proceed to a next code step, it is determined that the boot sequence completed successfully). In 508, an indication is provided to reset the wake up voltage threshold (e.g., to a base threshold value). In 510, the vehicle battery level is monitored. For example, the voltage level of a vehicle battery is monitored using an analog to digital converter and a processor to read the digitized value associated with the voltage level.

Figure 6:
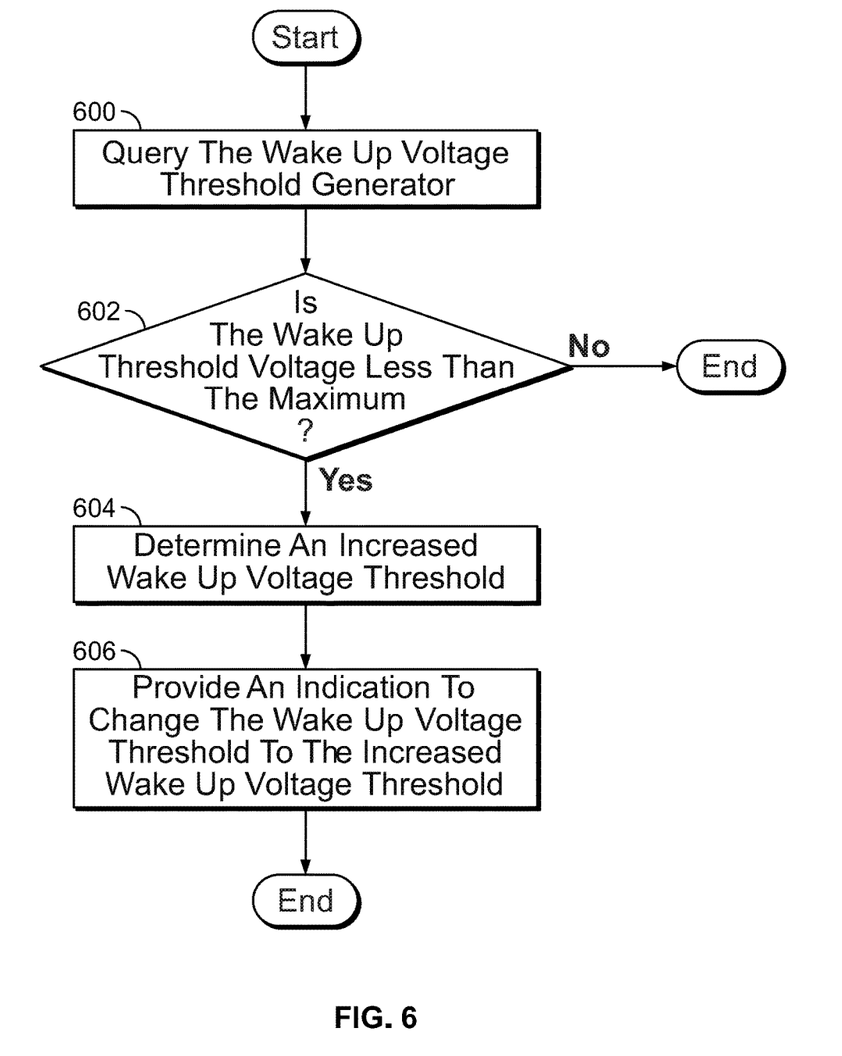
FIG. 6 is a flow diagram illustrating an embodiment of a process for providing an indication to increase a wake up voltage threshold.

FIG. 6 is a flow diagram illustrating an embodiment of a process for providing an indication to increase a wake up voltage threshold. In some embodiments, the process of FIG. 6 implements 502 of FIG. 5. In the example shown, in 600, a wake up voltage threshold generator is queried. For example, the wake up voltage threshold generator is queried for its present state. In various embodiments, the present state comprises an increment number of a set of increments, a wake up voltage threshold value, a digital potentiometer value, or any other appropriate state. In 602, it is determined whether the wake up threshold voltage is less than the maximum. In the event the wake up voltage threshold is not less than the maximum, the process ends. In the event the wake up voltage threshold is less than the maximum, control passes to 604. In 604, an increased wake up voltage threshold is determined. In various embodiments, a wake up voltage increment comprises 0.1 V, 0.2 V, 0.5 V, 1.0 V, or any other appropriate wake up voltage increment. In various embodiments, determining an increased wake up voltage threshold comprises determining an increased increment number, an increased wake up threshold value, a digital potentiometer value representing an increased wake up voltage threshold, or any other appropriate value. In 606, an indication is provided to change the wake up voltage threshold to the increased wake up voltage threshold.

Figure 7:
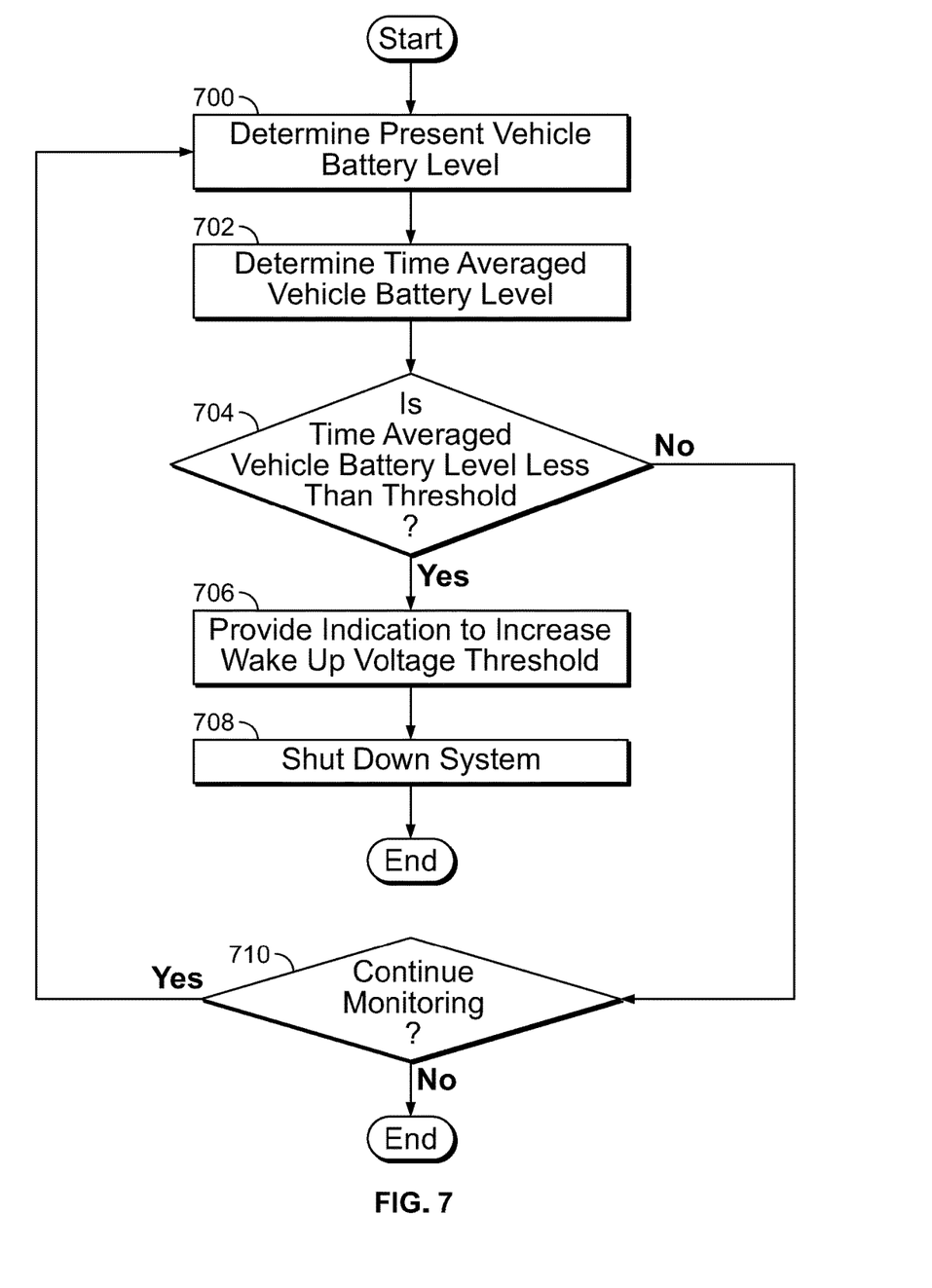
FIG. 7 is a flow diagram illustrating an embodiment of a process for monitoring a vehicle battery voltage.

FIG. 7 is a flow diagram illustrating an embodiment of a process for monitoring a vehicle battery voltage. In some embodiments, the process of FIG. 7 implements 510 of FIG. 5. In the example shown, in 700, a present vehicle battery level is determined. For example, the vehicle battery voltage is measured using a digital to analog converter. In 702, a time averaged vehicle battery level is determined. For example, determining a time averaged vehicle battery level comprises determining an average of a set of vehicle battery levels (e.g., present vehicle battery levels measured in 700) measured across a period of time (e.g., 10 seconds, 1 minute, 10 minutes, etc.). In 704, it is determined whether the time averaged vehicle battery level is less that a threshold. In the event it is determined that the time averaged vehicle battery level is not less than a threshold, control passes to 710. In the event it is determined that the time averaged vehicle battery level is less than a threshold, control passes to 706. In 706, an indication is provided to increase a wake up voltage threshold (e.g., using the process of FIG. 6). In 708, the system is shut down, and the process ends. For example, a signal is sent to turn off the power supply to a processor, a set of circuits, or any other appropriate power down sequence. In 710, it is determined whether to continue monitoring. In the event it is determined to continue monitoring, control passes to 700. In the event it is determined not to continue monitoring, the process ends. In some embodiments, determining whether a time averaged vehicle battery level is less than a threshold comprises determining whether a vehicle battery is being drained to an inappropriate level.

Figure 8:
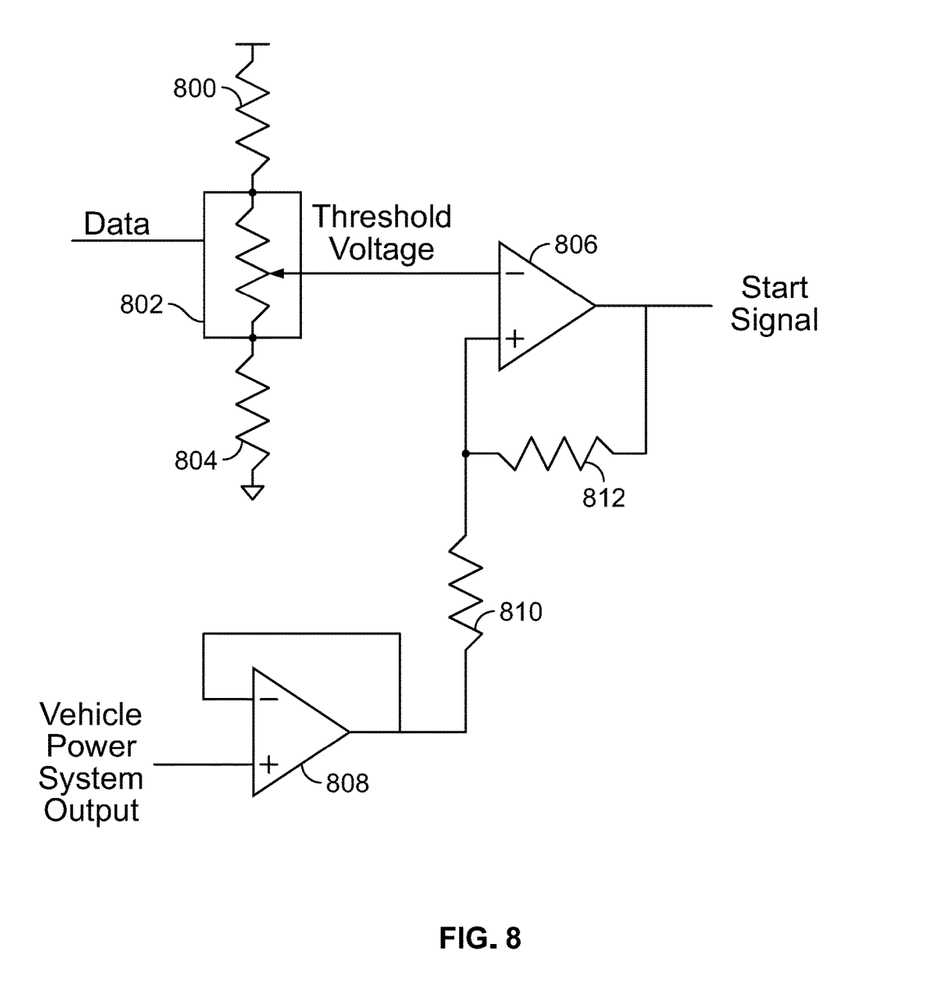
FIG. 8 is a block diagram illustrating an embodiment of a circuit for creating a threshold with hysteresis.

FIG. 8 is a block diagram illustrating an embodiment of a circuit for creating a threshold with hysteresis. In some embodiments, the circuit of FIG. 8 implements 404 and 406 of FIG. 4. In the example shown, a reference voltage is created using resistor 800, digital potentiometer 802, and resistor 804. Data coming in to digital potentiometer 802 sets the effective wiper position for the potentiometer, setting the threshold voltage seen at the wiper terminal. The threshold voltage is input to the negative terminal of comparator 806. In some embodiments, comparator 806 is implemented using an operational amplifier. The vehicle power system output received from the vehicle power system is buffered using op-amp 808 and is input to the positive terminal of comparator 806 via resistor 810 and resistor 812, forming a hysteresis network. Resistor 810 connects the output of op-amp 808 to the positive input of comparator 806 and resistor 812 connects the output of comparator 806 to its positive input. The hysteresis network moves the effective threshold voltage lower in the event comparator 806 output is high and higher in the event comparator 806 output is low.

Figure 9:
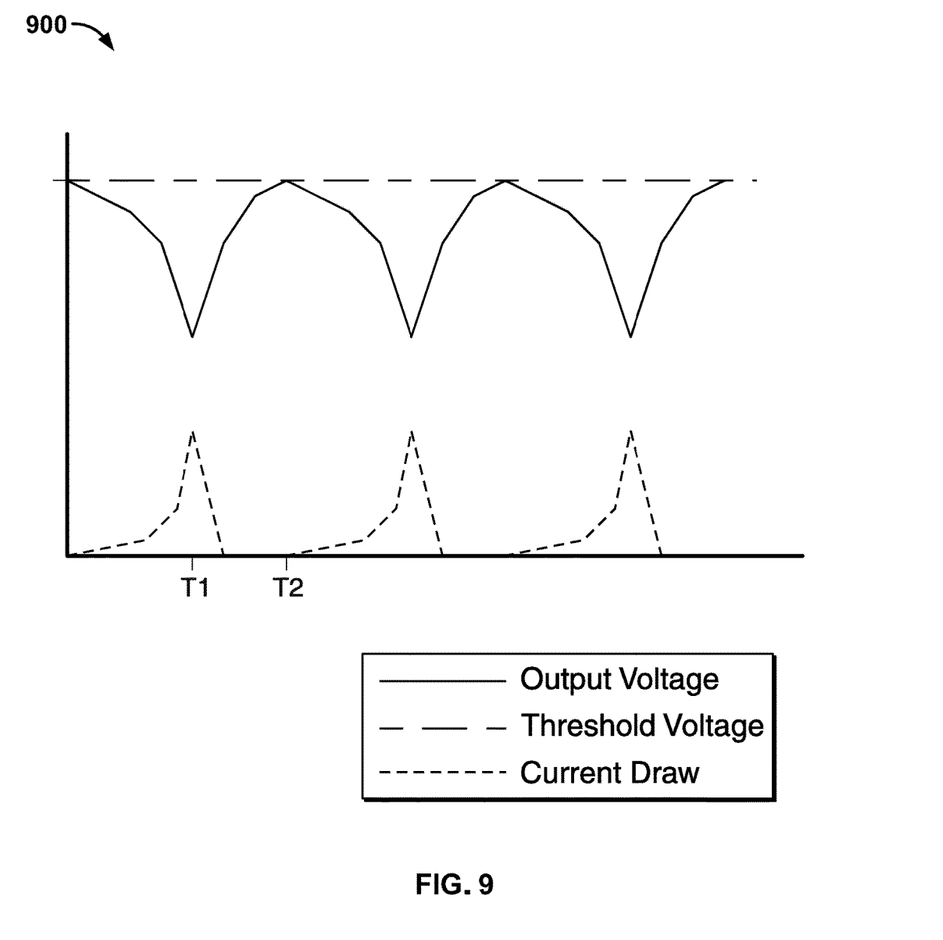
FIG. 9 is a graph illustrating an embodiment of vehicle battery output voltage, turn-on threshold voltage and vehicle event recorder current draw for a vehicle event recorder not including a system for vehicle battery drainage avoidance.

FIG. 9 is a graph illustrating an embodiment of vehicle battery output voltage, turn-on threshold voltage and vehicle event recorder current draw for a vehicle event recorder not including a system for vehicle battery drainage avoidance. In the example shown, the threshold voltage is constant (e.g., at 6 V, 9 V, 12 V, or any other appropriate voltage). Graph 900 begins as the vehicle event recorder turns on with the vehicle battery output voltage at the threshold voltage. As the turn on process begins, the current draw increases (e.g., the vehicle event recorder is drawing current from the vehicle battery) and the vehicle battery voltage drops. At time T1, the vehicle battery voltage has fallen far enough that the vehicle event recorder is no longer able to stay on. The vehicle event recorder shuts off, ceasing to draw current and allowing the vehicle battery voltage to recover. At time T2, the vehicle battery voltage reaches the turn-on threshold voltage, causing the vehicle event recorder to turn on and the cycle to repeat. In the example shown, the cycle repeats three times.

Figure 10:
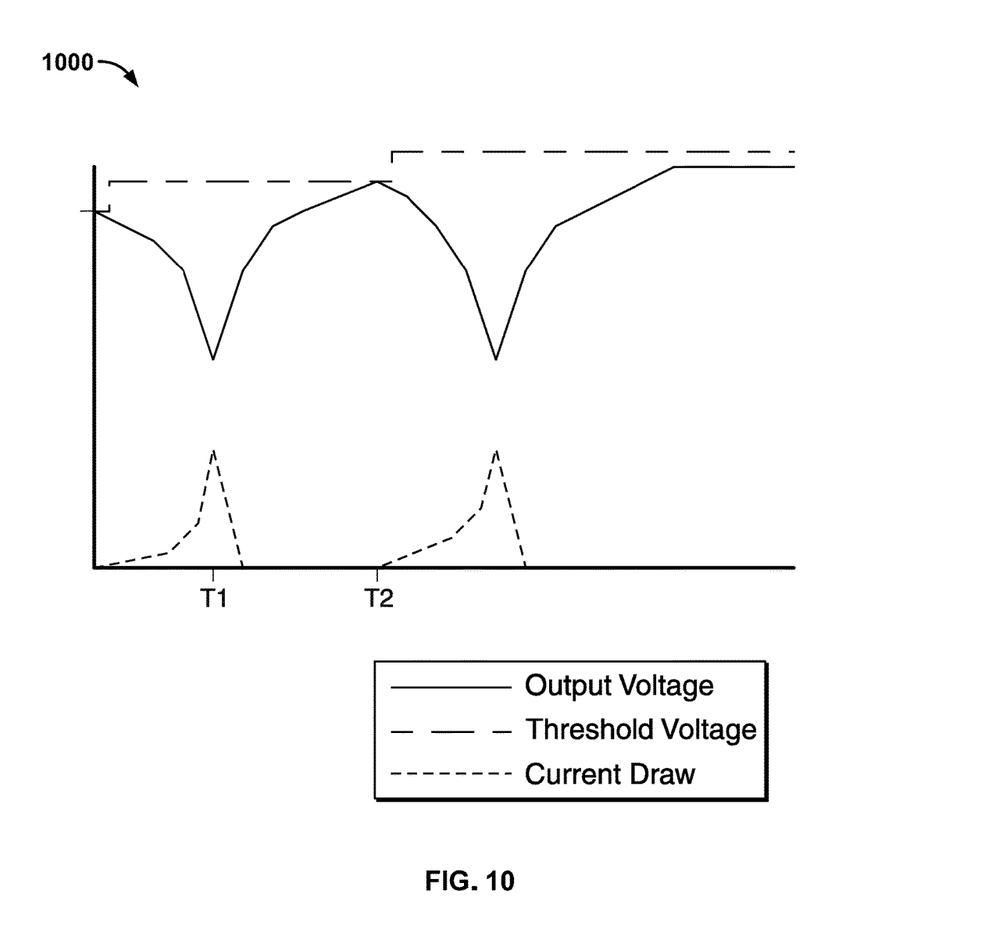
FIG. 10 is a graph illustrating an embodiment of vehicle battery output voltage, turn-on threshold voltage and vehicle event recorder current draw for a vehicle event recorder including a system for vehicle battery drainage avoidance.

FIG. 10 is a graph illustrating an embodiment of vehicle battery output voltage, turn-on threshold voltage and vehicle event recorder current draw for a vehicle event recorder including a system for vehicle battery drainage avoidance. In the example shown, the threshold voltage increases each time the vehicle event recorder is started. Graph 900 begins as the vehicle event recorder turns on, with the vehicle battery output voltage at the threshold voltage. The vehicle event recorder causes the threshold voltage to increase as it starts. As the turn on process begins, the current draw increases (e.g., the vehicle event recorder is drawing current from the vehicle battery) and the vehicle battery voltage drops. At time T1, the vehicle battery voltage has fallen far enough that the vehicle event recorder is no longer able to stay on. The vehicle event recorder shuts off, ceasing to draw current and allowing the vehicle battery voltage to recover. At time T2, the vehicle battery voltage reaches the increased turn-on threshold, and the process restarts. The vehicle event recorder causes the threshold voltage to increase a second time as it starts. After the vehicle event recorder shuts off a second time, the vehicle battery voltage recovers but not to the new level of the turn-on threshold, preventing the vehicle event recorder from starting again. In some embodiments, the vehicle battery voltage increases when the vehicle starts and the alternator turns on, providing power to charge the vehicle battery.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for drainage avoidance, comprising:
   an interface configured to receive an indication to power on, wherein a wake up voltage threshold is increased after a power on signal is received; and
   a processor configured to:
      perform a boot sequence;
      determine whether the boot sequence completed successfully; and
      in the event the boot sequence completed successfully;
         provide a reset indication to reset the wake up voltage threshold;
         monitor a vehicle battery voltage, wherein monitoring the vehicle battery voltage comprises determining a time averaged voltage value and comparing the time averaged voltage value with a battery level threshold voltage; and
         in the event it is determined that the time averaged voltage value is less than the battery level threshold voltage during monitoring the vehicle battery voltage:
            provide an increase indication to increase the wake up voltage threshold; and
            shut down the system.

2. The system of claim 1, wherein, in the event the boot sequence does not complete successfully, the reset indication to reset the wake up voltage threshold is not provided.

3. The system of claim 1, wherein the wake up voltage threshold is increased using a hardware circuit after the power on signal is received.

4. The system of claim 1, wherein the wake up voltage threshold is increased using a processor indication after the power on signal is received.

5. The system of claim 1, wherein the wake up voltage threshold is increased from a prior wake up voltage threshold.

6. The system of claim 5, wherein, in the event the prior wake up voltage threshold comprises a maximum wake up voltage threshold, the wake up voltage threshold is not increased.

7. The system of claim 5, wherein increasing the wake up voltage threshold comprises providing a change value indication to change a value of a digital potentiometer.

8. The system of claim 5, wherein increasing the wake up voltage threshold comprises providing an increase value indication to increase the value of the wake up voltage threshold by 0.5 V.

9. The system of claim 1, wherein the processor is further configured to wait for a predetermined period of time after receiving the indication to power on before determining whether the boot sequence completed successfully.

10. The system of claim 1, wherein determining whether the boot sequence completed successfully comprises determining whether a specific code step has been reached.

11. A method for drainage avoidance, comprising:
   receiving an indication to power on, wherein a wake up voltage threshold is increased after the power on signal is received;
   performing, using a processor, a boot sequence;
   determining whether the boot sequence completed successfully; and
   in the event the boot sequence completed successfully,
      providing a reset indication to reset the wake up voltage threshold;
      monitoring a vehicle battery voltage, wherein monitoring the vehicle battery voltage comprises determining a time averaged voltage value and comparing the time averaged voltage value with a battery level threshold voltage; and
      in the event it is determined that the time averaged voltage value is less than the battery level threshold voltage during monitoring the vehicle battery voltage:
         providing an increase indication to increase the wake up voltage threshold; and
         shutting down the system.

12. A computer program product for drainage avoidance, the computer program product being embodied in a non-transitory computer readable storage medium and comprising computer instructions for:
   receiving an indication to power on, wherein a wake up voltage threshold is increased after the power on signal is received;
   performing a boot sequence;
   determining whether the boot sequence completed successfully; and
   in the event the boot sequence completed successfully,
      providing a reset indication to reset the wake up voltage threshold;
      monitoring a vehicle battery voltage, wherein monitoring the vehicle battery voltage comprises determining a time averaged voltage value and comparing the time averaged voltage value with a battery level threshold voltage; and in the event it is determined that the time averaged voltage value is less than the battery level threshold voltage during monitoring the vehicle battery voltage:
  providing an increase indication to increase the wake up voltage threshold; and
  shutting down the system.

* * * * *

UNITED STATES PATENT AND TRADEMARK OFFICE
CERTIFICATE OF CORRECTION

PATENT NO. : 10,173,547 B1
APPLICATION NO. : 15/367960
DATED : January 8, 2019
INVENTOR(S) : Craig Denson Page 1 of 1

It is certified that error appears in the above-identified patent and that said Letters Patent is hereby corrected as shown below:

In the Specification

Column 8, Line 23, after "less", delete "that" and insert --than--, therefor.

Signed and Sealed this
Fourteenth Day of May, 2019

Andrei Iancu
*Director of the United States Patent and Trademark Office*